Dec. 28, 1965 N. R. TIMARES ETAL 3,225,649

APERTURE CARD CONVERSION CAMERA

Filed June 3, 1963 4 Sheets-Sheet 1

INVENTORS
NORMAN R. TIMARES
RONALD MACKENZIE

BY Allen Z. Botney

ATTORNEY

Dec. 28, 1965 N. R. TIMARES ET AL 3,225,649

APERTURE CARD CONVERSION CAMERA

Filed June 3, 1963 4 Sheets-Sheet 2

NORMAN R. TIMARES
RONALD MAC KENZIE
INVENTORS

BY Allen E. Botney

ATTORNEY

Dec. 28, 1965 N. R. TIMARES ETAL 3,225,649

APERTURE CARD CONVERSION CAMERA

Filed June 3, 1963 4 Sheets-Sheet 3

NORMAN R. TIMARES
RONALD MACKENZIE
INVENTORS

BY Allen E. Botney

ATTORNEY

INVENTORS
NORMAN R. TIMARES
RONALD MACKENZIE
BY Allen I. Bothey
ATTORNEY 3,225,649

APERTURE CARD CONVERSION CAMERA

Norman R. Timares, Woodland Hills, and Ronald MacKenzie, Playa Del Rey, Calif., assignors to FMA, Inc., El Segundo, Calif., a corporation of California Filed June 3, 1963, Ser. No. 285,073

8 Claims. (Cl. 88—24)

The present invention relates in general to the information storage and retrieval art and more particularly relates to a new and novel apparatus for transferring data from a card to a roll of film.

As is well known, punched cards are very extensively used nowadays for information storage and retrieval purposes. However, it may be advantageous and, therefore, desirable to transfer the information on a large number of these cards to a reel of film and this poses some very serious problems not only of expeditiously photographing them but also of providing some means for indexing them to facilitate later retrieval. This is particularly true of those cards on which a small film negative containing the information to be transferred, such as a blueprint or a schematic circuit diagram, is mounted in an aperture or window in one small part of the card. More specifically, the indexing information punched through the remaining portions of the cards would be of no value whatsoever if they were also transferred to the reel of film. Consequently, the punched portion of a card is not transferred, which means that some other form of indexing data must be provided and recorded on the reel of film at the same time that the desired card information is transferred to it. The present invention provides a novel solution to this problem.

More specifically, in addition to converting the photographic image in the aperture of the card to roll film, the present invention also makes it possible to record adjacent to each and every such roll film image two other kinds of information not found on the aperture card, namely, a frame-counter number and a code bar that approximately represents the counter number. The frame-counter number, which reflects the order of the pre-sorted cards in the input stack (low number on the counter signifies the bottom card in the stack) is recorded above or below the projected image of the photographic contents of the aperture card. The code bar, on the other hand, is recorded to the side, that is, to the right or left of the projected image. This code bar runs horizontally, parallel to the edges of the roll film, and its vertical position is controlled so that, as the frame-counter numbers increase, the position of the horizontal code bar is raised in steps from the lower edge of the projected image to the top. More particularly, the code bar moves up to its next higher position with ascending groups of counter numbers, i.e., groups of tens—10, 20, 30 . . . 90; groups of hundreds—100, 200, 300 . . . 900; and the two individual numbers, 1,000 and 2,000. The code bar does not ascend with each higher counter number. Therefore, the vertical position of the horizontal code bar reflects both the approximate frame-number and the approximate order of the corresponding aperture card in the pre-sorted stack. It is thus seen that the purpose of the code bar is to serve as a coarse index when images on the developed roll film are rapidly scanned for retrieval in viewing or projection equipment.

According to an embodiment of the invention, the aperture cards, pre-sorted and stacked upside down in appropriate order, are moved by an eletcro-mechanical feed system from an input hopper to a fixed position at a read station where, after being precisely positioned and photographed, they are ejected into a retrieval hopper. While a card is at the read station, two synchronized mechanical counters, one visible externally and the other mounted inside the camera assembly, generate the same frame-counter number. In addition, a data head, fed by the frame-counter, generates the aforesaid code bar. Three optical systems are used in recording: one system projects the image of the frame-counter number to the roll film; one projects the image of the code bar displayed at the face of the data head to the roll film; and the major optical system projects the aperture card film image from the read station to the roll film.

In recording, the counter and data-head displays are simultaneously and automatically recorded first by briefly switching on and then off lamps which illuminate the displays. Control of light and not shutters determines exposure time. Counter, data head, lamps, and optics are mounted above the camera. The two projected images of counter display and data-head display pass down into the camera through an open shutter to a flip mirror inclined at 45° in its normal position and mounted between the lenses and the camera focal plane. This flip mirror reflects both images to the roll film. The shutter in the top of the camera is always open during recording times, but it must be closed manually before opening the cabinet in order to change roll film. In its normal position, the flip mirror seals the camera and cuts off the projected light from the aperture card. However, after counter-number display and data-head display are recorded, the flip mirror flips down briefly, out of the major optical path, to admit the projected light from the aperture card to the roll film. After exposure, recording is completed and the flip mirror then pops up to cut off the projected light from the lamp above the aperture card and to once again seal the camera. The roll film is then advanced to the next frame. In the above-described operation, the sequencing and actuation of counter and data-head displays first and flip mirror second are controlled automatically by electrical circuitry.

A third device, the camera aperture, is mounted in the camera between the flip mirror and the film. It consists of two sliding shades, one on each side of the optical path, which can either be slid toward each other or slid apart in order to vary the width of the rectangle projected onto the roll film. The aperture or slot between the two shades can be varied to match the particular film format in the aperture card. The data-head is mechanically linked to the shades so that the data-head is driven left/right as the shade is driven left/right. This linkage insures that the code-bar display is always projected just to the side of the projected film format. In order to match the parallel inner sides of the shade with the parallel sides of the aperture card film format before recording takes place, a view-back system is built into the machine which permits the aperture card film image to be viewed along its optical path to the camera without exposing the film.

It is, therefore, an object of the present invention to provide apparatus for transferring to a roll of film information that is photographically recorded on a fixed area of a card.

It is another object of the present invention to provide apparatus for transferring a filmed image mounted on a card to a roll of film.

It is an additional object of the present invention to provide a machine that can transfer a filmed image on a portion of a card to a roll of film, and, at the same time, record retrieval data for the image thusly transferred.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

Figure 3:
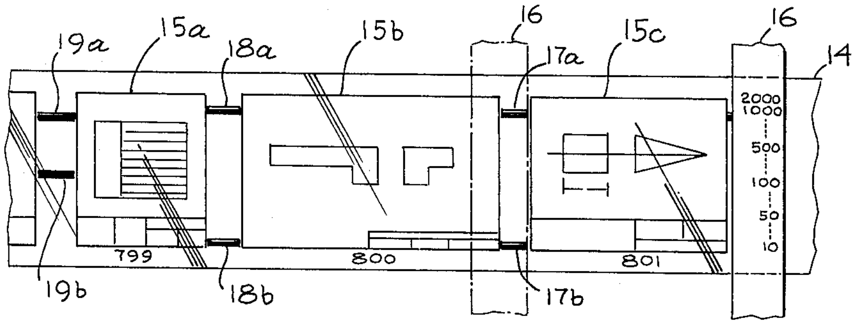
FIGURE 3 shows a portion of a roll of film on which information has been recorded by the machine of FIG. 2.
Figure 3A:
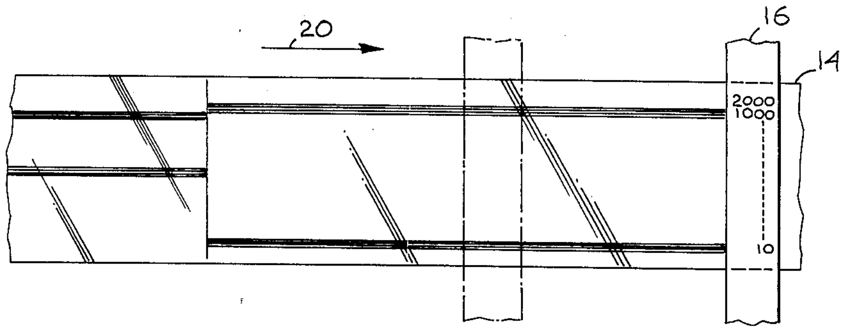
Figure 2:
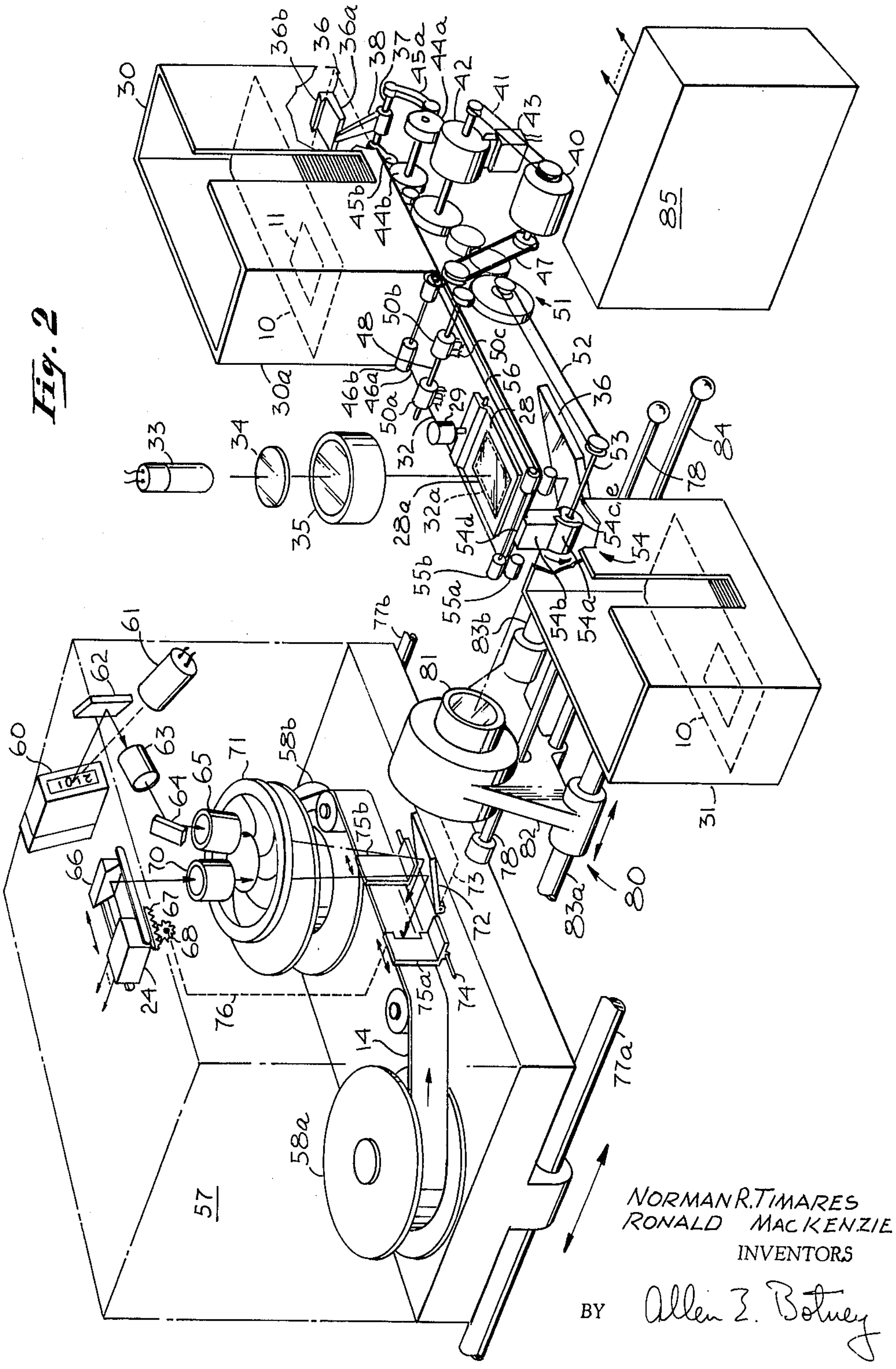
FIGURE 2 shows a machine in accordance with the present invention for transferring the filmed information on the card in FIG. 1 to a roll of film and for recording retrieval data on the roll alongside the transferred image.
Figure 4:
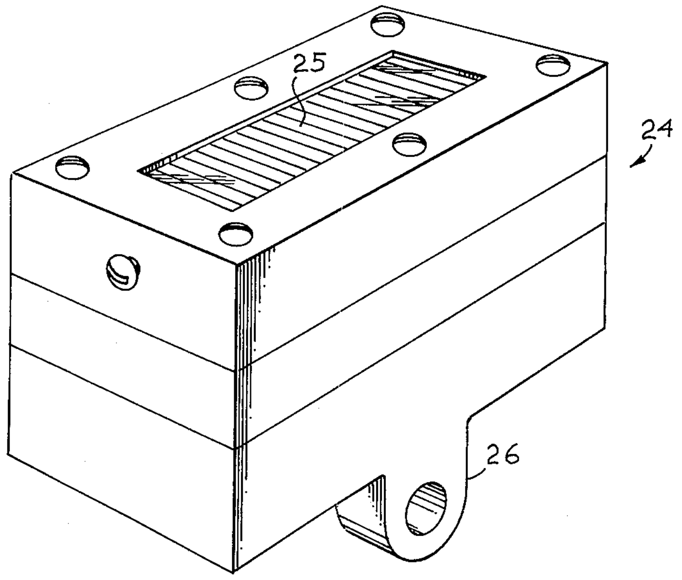
Figure 5:
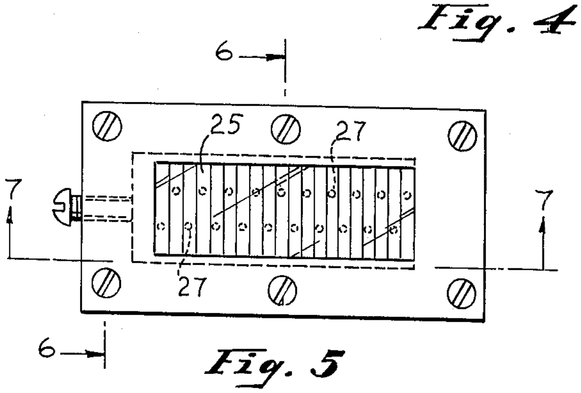
Figure 6:
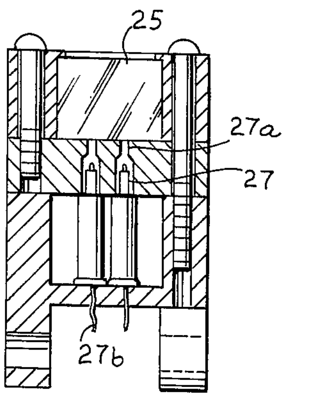
Figure 7:
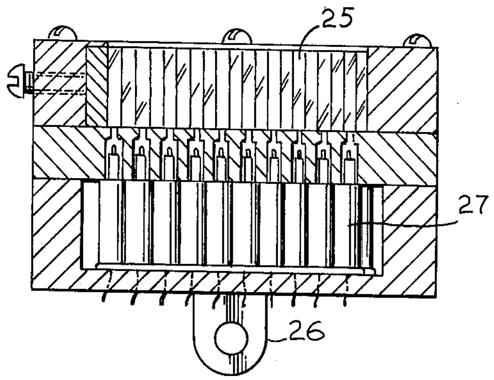

FIGURE 3*a* illustrates the appearance of the retrieval data when the roll of film is very rapidly scanned during the process of retrieving or locating a particular bit of information;

FIGURE 4 is an over-all view in perspective of the data-head used in the machine of FIG. 2 for producing the code-bar retrieval data;

FIGURE 5 is a top view of the data-head shown in FIG. 4;

FIGURE 6 is a cross-sectional view of the data-head taken along the lines 6—6 in FIG. 5;

FIGURE 7 is a cross-sectional view of the data-head taken along the lines 7—7 in FIG. 5; and FIGURES 8(*a*) and 8(*b*) together form an understandable diagram of the electrical circuitry used to control and operate the machine in FIG. 2.

Figure 1:
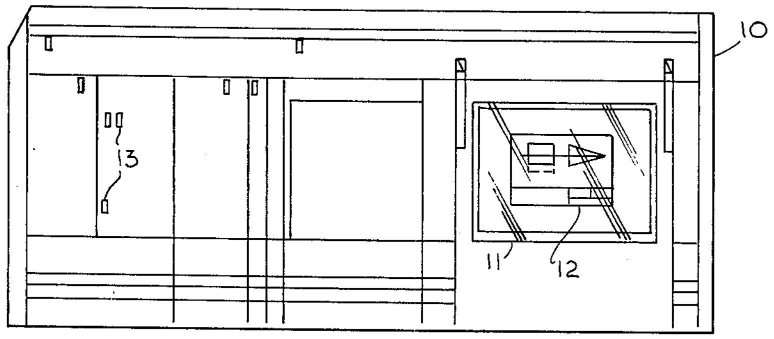
FIGURE 1 is an illustration of a punched card having an aperture in one portion of it in which a film negative containing information is mounted.

For a consideration of the invention in detail, reference is now made to the drawings and in particular to FIG. 1 therein wherein an aperture card is illustrated of the kind used in industry and in government to store information for later retrieval. The card is designated 10 and includes a rectangular opening or window in which is mounted a frame of film 11, the information being recorded within a predetermined area 12 thereon. As these cards are now used, a portion of each card is punched with holes in accordance with a predetermined code as, for example, holes 13 which provide the needed indexing information for later recovery of the card.

The present invention provides a machine for transferring the information or data contained on the film frames mounted on these cards to a reel of film and which, in addition, generates a new kind of retrieval or indexing data for recordation on the same reel of film. A small portion of a reel of film on which film-frame information and retrieval data have been recorded is shown in FIG. 3 to which reference is now made. The reel of film is designated 14 and the several areas of recorded information are designated **15*a*, 15*b* and 15*c*. Also included in the FIG. 3 illustration is the screen on a viewer or projection machine by means of which any area on the reel of film can be viewed. The referred-to portion of such a projection machine is designated 16** and it will be noticed that on its right side a vertical column of numbers are imprinted, in which the numbers range from 10 to 2000 in ascending order.

With respect to the retrieval data also recorded on the reel of film, attention is directed to the fact that beneath each area on which information is recorded is a number, such as numbers 799, 800 and 801 respectively beneath areas **15*a*, 15*b* and 15*c*. As will be more clearly seen later, these numbers exactly identify the bits of information according to the order in which they were recorded. Thus, by way of example, if card 10 in FIG. 1 is the 800th card whose information had been transferred, then the number beneath that information on film reel 14 will be 800. The same is true with respect to other transfers of information, that is to say, the information transferred immediately before will have number 799 recorded beneath it and that which is transferred immediately after will be identified on reel 14 by number 801. In addition to the numbers mentioned, another kind of retrieval data in the form of code bars is recorded in the spaces between areas 15. The code bars, such as code bars 17*a* and 17*b* in the space between areas 15*b* and 15*c*, together with the aforesaid column of numbers on member 16, provide a method for very quickly locating the approximate position of information on the reel. As may be seen from the figure, the code bars are horizontal, that to say, parallel to the long edges of the reel, and may be either opaque or transparent when recorded. Furthermore, the number of such code bars in any one space and the spacings between them approximate the numbers beneath areas 15 in that vicinity of the reel, as will now be explained. Thus, considering code bars 17*a* and 17*b* by way of example, code bar 17*a* is on the same level as number 800 on member 16 and code bar 17*b* is on the same level as number 10. Accordingly, code bars 17*a* and 17*b* together correspond to a figure of 810 which, obviously, is in the area of number 801. The same is true with respect to the code bars between areas 15*a* and 15*b*, which code bars are designated 18*a* and 18*b*. However, in the space immediately to the left of area 15*a*, are two code bars designated 19*a* and 19*b* that are respectively at the 700 and 90 levels on the column of numbers. Hence, the sum of the two numbers that are associated with code bars 19*a* and 19*b* is 790 which closely approximates number 799 beneath area 15*a***.

The manner in which the column of numbers, the code bars and the numbers beneath information areas 15 cooperate to expedite the location of a desired bit of information is illustrated in FIG. 3*a* wherein film 14 is shown moving very rapidly past projection screen 16 in the direction of arrow 20. As a result of this motion, the reel of film is scanned very rapidly. Consequently, code bars at the same level appear as continuous or unbroken bars to the viewer and, therefore, by collating the bars as seen with the column of numbers, a particular bit of information can be located approximately. Thereafter, the information can be located exactly by moving the reel of film forward or backwards in successive steps. In FIG. 3*a*, for example, the bars indicate that the viewer has reached numbers in the vicinity of 900 on the reel and, therefore, if information recorded on an area numbered 902 is desired, the film transport is stopped at this point and thereafter advanced in successive steps until number 902 is reached. The desired information has then been exactly located.

For an understanding of the manner in which the code bars are generated, reference is now made to FIGS. 4 through 7 in which several views of the data head mechanism is shown. An over-all external view in perspective of the data head, which is designated 22, is illustrated in FIG. 4 and is shown to include a plurality of transparent blocks 25 positioned one alongside the other in face-to-face relationship to form a sandwich-type assembly. As preferred herein, blocks 25 are of rectangular cross-section and may be made of such materials as glass or Lucite. As will be seen later, light will be made to pass through these blocks on a selective basis and, therefore, in order to prevent the light in one block from crossing over and entering adjacent blocks, their sides are coated as, for example, with a thin metal film. As shown in the figure, the data-head housing also includes means 26 for mounting the data head on a shaft.

A top view of the data-head mechanism is shown in FIG. 5 wherein the sandwich assembly arrangement of blocks 25 is clearly shown as well as a plurality of very small or tiny light sources 27 respectively positioned beneath the blocks. Thus, in the data head being shown and described, there are as many light sources 27 as there are transparent blocks 25, one light source beneath each block. For sake of convenience and also to obtain better heat dissemination, the positions of light sources 27 are staggered, with half of them in one line and the other half in another line. A side view of the data head in cross-section is shown in FIG. 6 wherein the relationship between blocks 25 and light sources 27 is more clearly depicted. From this figure it can be seen for the first time that the tips of light sources 27, designated **27*a*, protrude into or enter the blocks which have had openings made in their bottom sides to accommodate the light sources and this is done in order to maximize the forward distribution of the light through the blocks. At the bottom end of light sources 27 are the leads 27*b*** by means of which the light sources are energized. Finally, a side view of the data head mechanism, also in cross-section, is shown in FIG. 7 wherein the various previously mentioned or described elements of the data head are clearly illustrated.

In its operation, when one or more light sources 27 are energized, the blocks into which they extend are illuminated, with the result that the top faces of those blocks are likewise illuminated. In other words, when a light source 27 is energized, a relatively narrow rectangular-shaped beam of light emerges from the top of block 25 associated with the energized light source and it is this narrow rectangular-shaped beam of light that constitutes the source of the code bars ultimately recorded on film reel 14, as previously described. The manner in which the light sources are selected for energization will be described below.

The entire apparatus or machine by means of which the information contained on aperture cards are converted or transferred to a reel or film is shown in detail in FIG. 2 and includes a card-feed hopper 30 in which a large number of aperture cards 10 are stacked one above the other. Although hidden from view in the figure, hopper 30 does include in its forward or front wall **30*a*, at the base thereof, a narrow slit that is wide enough to permit an aperture card 10 to pass through it and out of the hopper. In front of hopper 30 and spaced from it is another hopper, namely, a card-retrieval hopper 31 in which, as will be seen later, cards 10 are stacked after the information on them has been transferred. As may be seen from the figure, hopper 31 is at a lower height than hopper 30 with the top of hopper 31 preferably being at the same level as or slightly below the level of the base of hopper 30**.

Mounted between hoppers 30 and 31 and substantially in the plane of their respective bottom and top surfaces, is an aperture card read station 32 which is basically a flat plate having a window or rectangular opening **32*a* through it. As may be expected, window 32*a* has substantially the same configuration and dimensions as film frames 11 on cards 10. Mounted above read station 32 is a solenoid-driven platten 28 having a window 28*a* superimposed over window 32*a*, the solenoid driving the platten being designated 29. Mounted above the platten and in a line with the center of windows 28*a* and 32*a* are a projection lamp 33, a light filter 34, and a condenser lens 35, the condenser lens being nearest the platten and the filter being between the projection lamp and the condenser lens. On the other side of read station 32, on the other hand, and also aligned with the center of window 32*a*, is a mirror 36 tilted at a predetermined angle which, for sake of convenience, is preferably a 45° angle. Resting inside card-feed hopper 30, at the base of the back end thereof, is a card-picker knife device 36 which is adapted to move to and fro along the hopper base for a short distance therealong. Device 36 may be said to be L-shaped in that it has a substantially flat plate-like base 36*a* and a very small upright portion 36*b* at its far end whose height is slightly less than the thickness of an aperture card 10. The stack of cards in hopper 30 rests on base element 36*a* and, as will be explained more fully later, the bottommost card in the stack is engaged and pushed forward by upright element 36*b*. Beneath card-picker device 36 is mounted an axle or shaft 37 which is fixed in position so that it cannot be displaced from that position but which is nevertheless free to rotate about its long axis. Coupled between shaft 37 and the bottomside of base element 36*a* is a bar 38 which is rigidly fixed at one end to shaft 37 and loosely linked mechanically to device 36 at its other end. It will thus be seen that as shaft 37 is made to rotate in one direction or another, that is, clockwise or counter-clockwise, bar 38 will likewise rotate in the same direction as the shaft and, in so doing, will move device 36** to or fro, respectively, as previously mentioned.

For the purpose of bringing about the described motion of device 36, the machine in FIG. 2 further includes a continuously-running motor 40 to which is linked, by means of a belt 41, a one-turn clutch 42. Clutch 42 is under the control of a solenoid 43 which normally prevents the clutch from turning but which, when energized, releases the clutch and permits it to make one full revolution. Clutch 42 is linked through a simple gearing arrangement to a pair of cams **44*a* and 44*b* on which a pair of cam followers 45*a* and 45*b* respectively ride. More specifically, cam followers 45*a* and 45*b* are fixedly mounted on shaft 37 at one of their ends and abut against and ride upon the peripheral surfaces of the cams. Consequently, during any one complete revolution of the cams, the associated cam followers are forced to rotate in a clockwise and counter-clockwise direction, thereby, in turn, causing shaft 37** to rotate in a similar manner.

Mounted immediately in front of and at the base of card-feed hopper 30 on a level with the slit through which cards 10 emerge from the hopper, are a pair of continuously-running drive rollers **46*a* and 46*b*, roller 46*a* being linked to motor 40 by means of a belt 47. Positioned in front of drive rollers 46*a* and 46*b* and fixedly mounted on a rotatable shaft 48 immediately above the surface of read station member 32 are a pair of rubber wipers 50*a* and 50*b* from which rubber fingers, such as rubber finger 50*c*, extend radialy outward. For reasons that will more clearly appear later, the spacing of shaft 48 from the surface of read station member 32 and the length of rubber fingers 50*c* are such that the clearance between the rubber fingers and the aforesaid surface is less than the thickness of a card 10. Shaft 48 is mechanically coupled to one-turn clutch 42 through a simple gearing arrangement 51 as is shown in the figure and, in addition, through the same gearing arrangement and a belt 52, it is linked to another rotatably mounted shaft 53 on which is mounted a card-stop mechanism generally designated 54**.

Mechanism 54 is basically constructed of two parts **54*a* and 54*b*, part 54*a* being rigidly mounted on shaft 53 and, therefore, rotatable with it, whereas part 54*b* is mounted above part 54*a* and is adapted to slide freely up or down, that is, in a vertical direction. As may be seen from the figure, part 54*a* is cylindrically-shaped but of continuously varying radius so that its cross-section configuration is very much in the nature of a spiral. As a result, part 54*a* is shown to include a ledge 54*c*. As for part 54*b*, it is generally square or rectangular-shaped and is cut to include ledges 54*d* and 54*e*, the height of ledge 54*e* being substantially equal to the height of ledge 54*c*. Part 54*b* rests on part 54*a* at the very edge of ledge 54*c* and when part 54*a*** is rotated very slightly in a counter-clockwise direction, part 54*b* clears ledge 54*c* and drops down so that, at the instant of clearance, ledges 54*c* and 54*e* are in face-to-face relationship. Ledge 54*d*, on the other hand, normally protrudes through the top of read station member 32 in an opening provided for it and, therefore, acts to stop and position the aperture cards emerging from hopper 10. However, when part 54*b* drops down for the reasons previously mentioned, ledge 54*d* moves down below the top surface of the read station member and its height is determined by this requirement.

At the very extremity of card read member 32 and in front of card-retrieval hopper 31 is mounted another pair of continuously-running drive rollers 55*a* and 55*b* which are driven by means of a belt 56 coupled between rollers 46*a* and 55*a*.

An important part of the FIG. 2 machine is the camera, generally designated 57, in which is mounted film reel 14 on take-up and supply reels 58*a* and 58*b*. Mounted above film reel 14, in the upper reaches of camera 57, is a film-frame counter 60, a frame-counter illuminator lamp 61, a first mirror 62, a first frame-number projection lens 63, a second mirror 64, and a second frame-number projection lens 65. More specifically, counter 60 and lamp 61 are mounted in face-to-face relationship so that the light from the lamp will illuminate the face of the counter and the number thereon. Mirror 62 is disposed between the counter and the lamp facing the counter and is tilted or oriented at an angle such that the light reflected from the face of counter 60 will, in turn, be reflected by mirror 62 to projection lens 63. Mirror 64, however, is positioned or disposed between projection lenses 63 and 65 and is likewise tilted or oriented at an angle that will reflect light passing through lens 63 to lens 65.

Also mounted in the upper regions of camera 57 is data head 24 previously described in detail in connection with FIGS. 4–7. Data head 24, it will be remembered, generates a code-bar display that closely correlates with the number displayed by counter 60 and for this reason, therefore, light sources 27 in data head 24 are electro-mechanically connected to the counter. Thus, counter 60 acts as a switch for data head 24 and as the elements of the counter change position with the display of each new number, the appropriate light sources in the data head are energized to generate the desired combination of code bars. Counters are very well known devices and so are counters whose elements are arranged to act as switches in the nature of a time clock. Accordingly, a detailed description of the counter is not deemed necessary. Data head 24, along with a mirror 66 positioned to reflect the code-bar display, are fixedly mounted on a tract 67 which meshes with a gear 68 by means of which the tract and the elements mounted on it can be linearly displaced. Positioned beneath mirror 66 is a code-bar projection lens 70 through which the light reflected from mirror 66 passes and when tract 67 is displaced slightly in one direction or another, the code-bar display reflected from mirror 66 and passed through lens 70 is similarly displaced.

A shutter 71 is positioned directly beneath lenses 65 and 70, the shutter being at all times open during recording but manually operable to be closed before opening the camera cabinet in order to change the reel of film. What may be termed a flip mirror 72 sits directly beneath shutter 71 and in front of film reel 14, the flip mirror being swivably or rotatably mounted at one end on a shaft that is not shown for sake of simplicity. Mirror 72 is normally maintained at an angle that will reflect light or images from lenses 65 and 70 to film reel 14 but when the need or occasion arises, as will be seen later, mirror 72 is rotated into a flat or horizontal position as is indicated by the broken lines outlining area 73. Any one of a number of known devices, such as a solenoid, could be used to move mirror 72 but because such devices and the manner in which they would be coupled to the mirror are so well known, for sake of clarity, that is, to avoid unnecessarily encumbering the drawing at this point, no such device is shown.

Finally, mounted on a track 74 for movement therealong is a pair of camera aperture shades 75*a* and 75*b*, the track and the shades thereon being positioned immediately in front of film reel 14 and in face-to-face relationship therewith. Shades 75*a* and 75*b* define the area on film reel 14 on which recording is to take place but are adapted to move in unison toward or away from each other in order to adjust the recording area to different film-frame formats on the aperture cards. Furthermore, shades 75 are coupled by a simple mechanical linkage, as is indicated by broken line 76, to gear 68, with the result that track 67 and data head 24 and mirror 66 thereon are displaced in one direction or another according to whether the shades are brought closer together or moved further apart. In this way, the code-bar display can be properly recorded in the space provided for it irrespective of the type of film format encountered.

Completing the description of the camera, the camera is slidably mounted on a pair of rods only one of which, namely, rod 77*a*, is shown in the figure. By means of this arrangement, camera 57 can be moved toward the front or rear end, in order to initiate this kind of motion, a relatively long rod 78 is fastened to the front of the camera and made available to the operator of the machine for manual operation. As will be recognized by those skilled in the art, the camera is movable frontward or backward in order to accommodate the different film formats mentioned previously.

Positioned in front of the camera between the camera and mirror 36 is a lens assembly generally designated 80. More particularly, assembly 80 includes a projection lens 81 rigidly mounted in a frame 82, the frame itself, like the camera, being slidably mounted on a pair of rods 83*a* and 83*b* so that it can be moved frontward or backward. As may be seen from the figure, projection lens 81 is on a line with mirrors 36 and 72 and is moved frontward or backward with the camera to accommodate the different film formats that may be used. As in the case of the camera, a rod 84 is fixed to frame 82 and made available to the operator of the machine for the purpose of setting the lens assembly when required. Thus, the camera-and-lens settings insure that the height of the image projected from any one of the different aperture card film formats is always the same on film reel 14. The width, however, of the projected image will vary according to the aperture card film format being used, camera aperture shades 75*a* and 75*b* providing a means of insuring that no more film will be exposed than the width of the projected image.

In concluding a description of the constructional features of the machine, it should be mentioned that the electronics for the machine is housed in box 85 and includes a power source as well as a combination of relays that control the operations of the various members of the machine. Thus, by way of example, counter 60 is connected to electronics 85 in order to respectively connect or disconnect light sources 27 in data head 24 to and from the power supply as the numbers displayed by the counter change. Similarly, solenoid 43, projection lamps 33 and 61, etc., are also connected to electronics circuitry 85.

In operation, clutch 42 is continuously driven by motor 40. However, the clutch slips until solenoid 43 is activated to release it, at which time the clutch takes hold and makes one complete turn before it is locked for slippage once again. Solenoid 43 is periodically energized, with the result that clutch 42 is periodically permitted to make one complete revolution. During each such turn of the clutch, cams 44*a* and 44*b* are also rotated once around, with the result that, due to the eccentricity of the cams, cam followers 45*a* and 45*b* are driven both in a clockwise and counter-clockwise direction. In consequence thereof, shaft 37 and, therefore, member 38, are likewise driven through an arc in a clockwise and counter-clockwise direction. Accordingly, during each complete turn of clutch 42, card-picker knife device 36 moves backward until it is free of the stack of cards 10 and then moves forward again to push the bottommost card in the stack through hopper 30 to feed rollers 46a and 46b.

During this same rotation of clutch 42, members 50a and 50b, on which rubber fingers or wipers 50c are mounted, and member 54a, all of which are coupled to the clutch, as previously described, rotate once around. As a result, card-stop member 54b drops down so that ledge 54d clears the top surface of read-station member 32 and, at the same time, rubber wipers 50c engage the aperture card that is then in the read station position to push it forward to feed rollers 55a and 55b. Just prior to this action, solenoid 29 is activated to raise platten 28 so as to release the card beneath it.

Feed rollers 55a and 55b grip the card being fed to it and eject it to card-retrieval hopper 31, following which member 54b is pushed upward once again by member 54a so that its ledge 54d once again emerges through the top surface of read-station member 32. In the meantime, card 10 being fed to feed rollers 46a and 46b is gripped by these rollers and ejected forward onto the the read-station member until it abuts against ledge 54d. When this occurs, film frame 11 on the card is aligned with, that is to say, superimposed upon, window 32a. Platten 28 then comes down on the card to hold it flat and in position. In this position, light from lamp 33 and passing through filter 34 and projection lens 35 also passes through film frame 11 and window 32a to reflecting mirror 36, thereby projecting upon the mirror an image of the information contained or recorded on film frame 11. This light image is reflected by mirror 36 through lens 81 to flip mirror 72 in front of the camera. However, because the flip mirror is at an upward angle, it shields the aperture leading to film reel 41 and thereby temporarily prevents the image of the information contained on film frame 11 from passing to and being recorded on the reel of film.

Looking now to camera 57, the code-bar display on the face of data head 24 is incident on mirror 66 and reflected there from to projection lens 70 through which it passes to flip mirror 72. Similarly, when energized, lamp 61 throws its light on the face of frame counter 60 to illuminate number thereon and the image of this number is then reflected to mirror 62 which, in turn, reflects the image to projection lens 63. After passing through the projection lens, the image of the number is incident upon mirror 64 from which it is reflected through projection lens 65 to flip mirror 72. Thus, both the code-bar display and the frame-counter number are simultaneously projected upon the front face of flip mirror 72 from which they are reflected to the area of film reel 14 between aperture shades 75a and 75b and recorded thereon in the manner previously explained. Following the recordation of the number and code-bar displays, the solenoid or other device that controls the movement of flip mirror 72 is energized and, in response thereto, mirror 72 is flipped or rotated into position 73, thereby allowing the image of the aperture-card information to impinge upon the recording area on film reel 14. It is thus seen that in the embodiment illustrated and being described herein, the retrieval data is recorded first and then the aperture-card information. Following this, flip mirror 72 is returned to its first position and film reel 14 is advanced to the next recording area. Accordingly, the machine is now ready for another cycle of operation which may be initiated either automatically or manually.

Figure 8A:
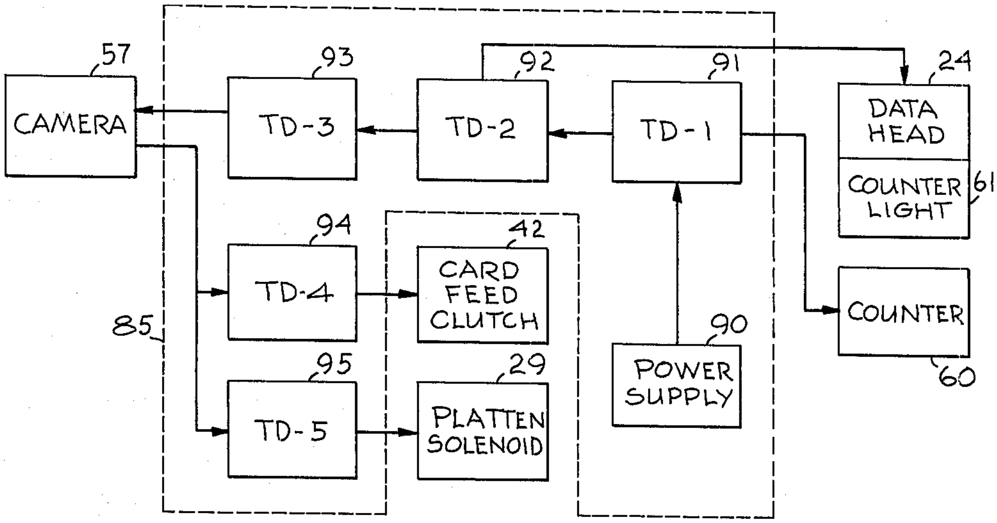

Reference is now made to FIG. 8a wherein is shown a block diagram that illustrates the basics of electronics circuitry 85 in FIG. 2. As illustrated, circuitry 85 basically includes a power supply 90 and a plurality of time delay units 91 through 95 which may be time-delay relays, multivibrators, or any other equivalent device. Power supply 90 is connected to the input end of unit 91 whose output end is connected to both counter 60 and time-delay unit 92. The output of unit 92, on the other hand, is fed to both data head 24 and counter light 61 as well as to time-delay unit 93 which is connected between unit 92 and camera 57. As for time-delay units 94 and 95, they are both connected at their input ends to camera 57, unit 94 being connected at its output end to card-feed clutch 42 and unit 95 being connected at its output end to platten solenoid 29.

Figure 8B:
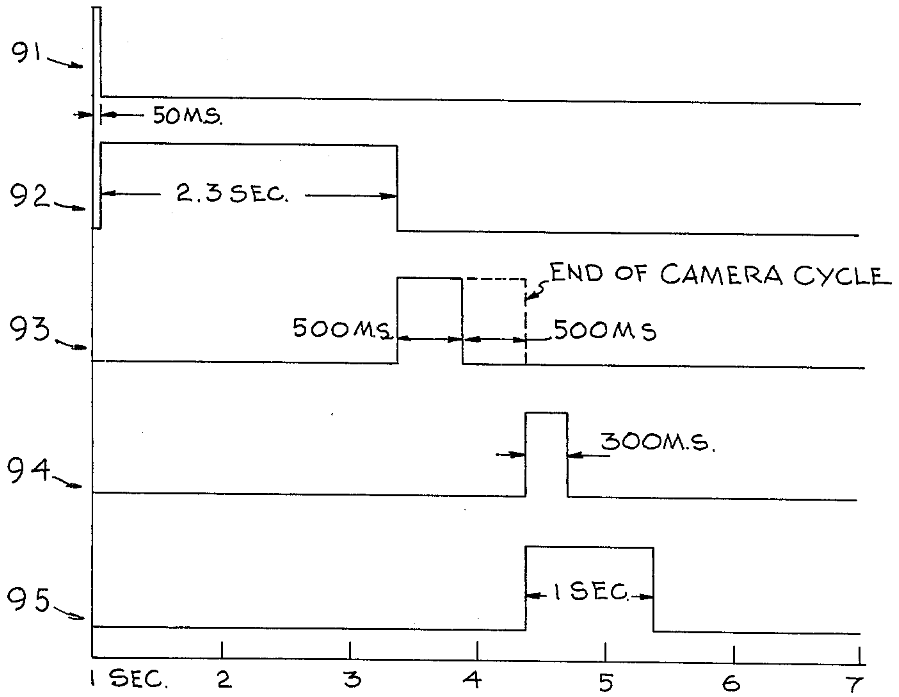

For an understanding of the operation of circuitry 85 and of the manner in which it controls the operation of the machine shown in FIG. 2, which was previously described, wherein the duty cycles of the several time-delay units are presented in flow-chart form. Thus, time-delay unit 91 has a duty cycle of 50 ms., time-delay unit 92 has a duty cycle of 2.3 seconds, time-delay unit 93 has a duty cycle of 500 ms., time-delay unit 94 has a duty cycle of 300 ms. and time-delay unit 95 has a duty cycle of 1 second. In more specific terms, at the beginning of a complete cycle of operation for the machine in FIG. 2, as was described above, time-delay unit 91 is activated to pulse counter 60 which, in response thereto, flips or shifts to the next succeeding number. At the close of the duty cycle for unit 91, the duty cycle for time-delay unit 92 commences and, during this 2.3 second interval, light sources 27 in data head 24 and counter projection light 61 are energized, with the result that the code-bar display and the counter number are illuminated for projection on film reel 14. Time-delay unit 93 starts its 500 ms. duty cycle at the same moment that the duty cycle for unit 92 closes and, in consequence thereof, the device controlling flip mirror 72 is activated to rotate the flip mirror into position 73. Accordingly, it is at this time that the information image derived from film frame 11 on aperture card 10 is recorded on film reel 14. At the end of this duty cycle, flip mirror 72 is returned to its former position, the film transport in camera 57 thereafter advancing the reel of film to its next frame, as is indicated in FIG. 8b by the broken-line pulse designated "End of Camera Cycle." Once the reel of film has been advanced and the camera cycle ended, time-delay 94 and 95 respectively go through their duty cycles. Thus, at this time, clutch 42 is activated as well as platten solenoid 29, platten 28 being raised to permit the card beneath it on the read station to be ejected into card-retrieval hopper 31 and to also permit another card from card-feed hopper 30 to be inserted beneath it. At the end of the duty cycle for time-delay unit 95, platten 28 is lowered upon the card then in position on the read station for the dual purpose of keeping the card fixed in position and, at the same time, keeping the card and the film frame thereon flat to avoid image distortion.

Although a particular arrangement of the invention has been illustrated herein by way of example, it will be recognized by those skilled in the art that various modifications, alterations, substitutions, etc., can be made with respect to some parts of it. Accordingly, the invention should be considered to include any and all modifications, alterations or equivalent arrangements falling within the scope of the annexed claims.

For example, it has been taught above that apparatus of the present invention is designed to transfer information on cards to a reel of film. It will be recognized by those skilled in the art that with but slight modification, such apparatus could also be used to transfer information from one reel of film to another or to transfer information from several reels of film to a single reel. This can be accomplished by substituting an appropriate film-transport system for the card-feed system shown in the drawings and described earlier. By appropriate is meant one by means of which the selected frames in a reel can be interposed between the light source and the mirror at the read station. Such film transport systems are available and, therefore, do not require any further invention.

Having thus described the invention, what is claimed is:

1. Apparatus for converting information recorded on cards to a single reel of film, said information being recorded on frames of film respectively mounted in apertures in said cards, said apparatus comprising: a light source; a mirror; means for successively positioning the cards so that the frames of film are between said light source and said mirror, whereby light passes through the frames of film to said mirror; a camera mounted to receive the light reflected from said mirror, said camera containing the reel of film; a first structural arrangement for projecting successive frame-counter numbers toward said camera that respectively correspond to the order in which the cards are fed to the apparatus; a second structural arrangement for projecting toward said camera code bars whose positions between the edges of the film reel respectively approximate said frame-counter numbers; additional means for simultaneously admitting said number and code bar projections to said camera for recordation on the reel of film therein; further means for projecting the light reflected from said mirror to said reel of film for recordation of the film frames thereon, said film frames being recorded between said code bars and frame-counter numbers; and equipment for advancing the reel of film a predetermined amount after each recording sequence.

2. The apparatus defined in claim 1 wherein said apparatus further comprises structure for adapting the apparatus to differently sized film frames, said structure including: a pair of adjustable shades positioned in front of a camera and movable toward and away from each other for varying the exposed area on the reel of film; a camera transport for sliding the camera into one of several fixed positions corresponding to said several different film frame sizes; and a lens transport for adjusting the focusing of the projected information image on the reel of film in accordance with the position of said camera.

3. The apparatus defined in claim 1 wherein said means for successively positioning the cards includes a card-feed hopper in which the cards are initially stacked; a card-retrieval hopper in which the cards are ultimately stacked; a read station between said card feed and retrieval hoppers, said read station having a window over which said frames of film are positioned; said light source mounted over said window on one side thereof; said mirror oriented to reflect light toward the camera mounted on the other side of said window; and equipment for automatically ejecting a card from said read station and into said retrieval hopper while at the same time feeding the next card to said read station, said equipment including means for positioning the film frame on each card so that it is superimposed on the window of said read station.

4. Apparatus for converting information recorded on cards to a single reel of film, said information being recorded on frames of film respectively mounted in apertures in said cards, said apparatus comprising: a camera in which the reel of film is mounted; first and second means for respectively projecting an image of the information contained on a card and an image of retrieval data for said information toward said camera at the same time; and third means for successively exposing an area on the film to said retrieval data and said information images, said third means including a mirror that is rotatable through an acute angle mounted in front of said camera and in the optical paths of both the retrieval data and the information images, said mirror being positioned along one side of said acute angle to reflect said retrival data image into the camera and onto said reel of film and along the other side of said angle for admitting said information image to said camera and to said film; and means for rotating said mirror through said acute angle from its first to its second position following the exposure of the film to said retrieval data image.

5. Apparatus for converting information recorded on cards to a single reel of film, said information being recorded on the frames of film respectively mounted in apertures in said cards, said apparatus comprising: a camera in which the roll of film is mounted; a light source; a mirror mounted to reflect light from said light source to said camera; a card-feed hopper in which the cards are initially stacked; a card-retrieval hopper in which the cards are ultimately stacked; a read station between said card-feed and retrieval hoppers, said read station having a window between said light source and said mirror over which said frames of film are positioned; equipment for automatically ejecting a card from said read station and into said retrieval hopper and at the same time feeding another card from said feed hopper to said read station, said equipment including a structural arrangement for positioning the film frame on each card so that it is superimposed in the window of said read station, whereby the information recorded on the film frames are projected in succession as images against said mirror and reflected therefrom toward said camera; a system including a counter mechanism for displaying a number that corresponds to the number of cards fed to said read station; a first optical system for projecting an image of said number toward said camera; a retrieval-data mechanism for displaying code bars on the face thereof, the positions of the code bars on said face corresponding to the number displayed by said counter; a second optical system for projecting an image of said code bars toward said camera; means coupled between said equipment and said counter and retrieval-data mechanisms for advancing the number and code bar displays thereon as said cards are fed to said read station; a flip mirror rotatably mounted in front of said camera and in the optical paths of said code bar, counter number and film-frame images, said mirror being positioned at a first angle to simultaneously reflect said code bar and counter images into the camera and onto said reel of film and at a second angle for admitting said film-frame image thereto; and means for rotating said flip mirror from said first to said second position after exposure of the film to said code bar and counter number images.

6. The apparatus defined in claim 5 wherein said retrieval data mechanism includes a plurality of transparent blocks in a sandwich arrangement, each of said blocks being coated to prevent light from passing from one to another; at least one source of light mounted beneath each of said blocks; and an electro-mechanical arrangement coupled between said sources of light and said counter mechanism for switching on light sources selected in accordance with the number displayed by said counter mechanism, those light sources switched on illuminating their associated blocks to produce said code bars on the faces thereof.

7. In apparatus for transferring information recorded on a stack of cards to a single reel of film where the information is recorded on frames of film respectively mounted in apertures in said cards, means for providing retrieval data for recordation alongside each bit of information transferred, said means comprising: a counter mechanism for displaying a number that corresponds to the position of a card in the stack when the information on that card is transferred; and a retrieval-data mechanism that includes a plurality of transparent blocks in a sandwich arrangement, each of said blocks being coated to prevent light from passing from one to another, at least one source of light mounted beneath each of said blocks; and an electro-mechanical arrangement coupled between said sources of light and said counter mechanism for switching on light sources selected in accordance with the number displayed by said counter mechanism, those light sources switched on illuminating their associated blocks to produce bars of light on the faces thereof.

8. A machine for transferring information recorded on a stack of cards to a single reel of film where said information is recorded on frames of film respectively mounted in apertures in said cards, said machine comprising: a first apparatus for producing in sequence a light image of the information contained on said frames of film; second apparatus coupled to said first apparatus and activated by it as each image is produced to display a number corresponding to the position of the associated card in the stack; third apparatus coupled to said second apparatus and activated by it as each new number is displayed to illuminate a pattern of parallel bars in accordance with a code; a first optical system for projecting the aperture card film image along a first optical path toward a first area on the reel of film; a second optical system for projecting an image of the number produced by said second apparatus along a second optical path toward a spot beneath said first area on the reel of film; a third optical system for projecting the pattern of code bars produced by said third apparatus along a third optical path toward a second area on said reel of film alongside a vertical edge of said first area; and means for first exposing said reel of film to said number image and to said pattern of code bars and then to said aperture card film image.

References Cited by the Examiner

UNITED STATES PATENTS

| | | | |
|---|---|---|---|
| 2,646,334 | 7/1953 | Marchand | 346—107 |
| 2,703,280 | 3/1955 | Butterfield et al. | 88—24 X |
| 2,849,916 | 9/1958 | Nolan | 88—24 |
| 2,868,064 | 1/1959 | Henkel | 346—107 X |
| 2,881,658 | 4/1959 | Bornemann. | |
| 2,968,992 | 1/1961 | Billet | 88—24 |
| 3,182,549 | 5/1965 | Thompson et al. | 88—24 |

FOREIGN PATENTS

| | | |
|---|---|---|
| 1,061,039 | 11/1953 | France. |

NORTON ANSHER, *Primary Examiner.*

RICHARD A. WINTERCORN, *Assistant Examiner.*